(12) United States Patent
Husband et al.

(10) Patent No.: US 10,161,264 B2
(45) Date of Patent: Dec. 25, 2018

(54) HELICALLY ACTUATED VARIABLE BEARING DAMPER

(71) Applicant: United Technologies Corporation, Farmington, CT (US)

(72) Inventors: Jason Husband, South Glastonbury, CT (US); Thomas Gresham, Manchester, CT (US); Michael D. Greenberg, Bloomfield, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/495,483

(22) Filed: Apr. 24, 2017

(65) Prior Publication Data
US 2018/0306061 A1 Oct. 25, 2018

(51) Int. Cl.
*F01D 25/16* (2006.01)
*F16C 17/02* (2006.01)
(Continued)

(52) U.S. Cl.
CPC ........... *F01D 25/164* (2013.01); *F02C 7/06* (2013.01); *F16C 17/02* (2013.01); *F16C 27/02* (2013.01);
(Continued)

(58) Field of Classification Search
CPC ........... F16C 27/045; F16C 2226/16; F16C 2226/60; F16C 27/02; F16C 17/02;
(Continued)

(56) References Cited

U.S. PATENT DOCUMENTS

| 738,445 | A | * | 9/1903 | Hoffmann | ............. | F16C 35/073 |
| | | | | | | 301/111.03 |
| 2,182,012 | A | * | 12/1939 | Bunnell | ................. | B24B 41/04 |
| | | | | | | 384/128 |

(Continued)

FOREIGN PATENT DOCUMENTS

| EP | 1010917 B1 | 11/2001 | |
| GB | 1284602 | 8/1972 | |
| JP | 08159153 A | * 6/1996 | ............. F16C 27/045 |

OTHER PUBLICATIONS

Machine Translation of JP H08-159153 (Year: 1996).*
Extended European Search Report for EP Application No. 18169006.6, dated Aug. 1, 2018, 9 pages.

*Primary Examiner* — Alan B Waits
(74) *Attorney, Agent, or Firm* — Kinney & Lange, P.A.

(57) ABSTRACT

A bearing damper assembly for a bearing compartment of a gas turbine engine includes a squirrel cage, a bearing support, an outer sleeve, and an inner sleeve. The bearing support is disposed radially outward from a portion of the squirrel cage. The outer sleeve extends axially from the bearing support. The inner sleeve is attached to the squirrel cage and is disposed radially inward from the outer sleeve. An outward surface of the inner sleeve has a first contoured portion having a first axially extending contour and an inner surface of the outer sleeve has a second contoured portion having a second axially extending contour. The outward surface of the inner sleeve and the inner surface of the outer sleeve define a gap extending between the first contoured portion and the second contoured portion. The gap forms a fluid damper.

17 Claims, 6 Drawing Sheets

(51) Int. Cl.
*F16C 27/02* (2006.01)
*F16C 35/02* (2006.01)
*F02C 7/06* (2006.01)

(52) U.S. Cl.
CPC .......... *F16C 35/02* (2013.01); *F05D 2220/32* (2013.01); *F05D 2240/54* (2013.01); *F16C 2360/23* (2013.01)

(58) Field of Classification Search
CPC ... F16C 2326/23; F16C 35/02; F16F 15/0237; F05D 2240/50; F05D 2240/54; F05D 2220/32; F01D 25/164; F01D 1/04; F02C 7/06
See application file for complete search history.

(56) References Cited

U.S. PATENT DOCUMENTS

| | | | |
|---|---|---|---|
| 2,513,970 A * | 7/1950 | Sisulak | F16C 35/073 403/259 |
| 2,670,253 A * | 2/1954 | Scherler | F16C 25/06 384/570 |
| 3,227,250 A * | 1/1966 | Cram | E02F 9/006 29/458 |
| 3,639,014 A | 2/1972 | Sixsmith | |
| 3,899,224 A | 8/1975 | Schuller et al. | |
| 3,906,635 A * | 9/1975 | Lares | A61C 1/05 415/904 |
| 4,084,861 A * | 4/1978 | Greenberg | F01D 25/164 384/105 |
| 4,097,094 A | 6/1978 | Gardner | |
| 4,240,677 A * | 12/1980 | Payne | F16C 35/063 384/252 |
| 4,392,751 A * | 7/1983 | Ida | F16C 32/067 384/114 |
| 5,088,840 A * | 2/1992 | Radtke | F01D 25/164 384/535 |
| 5,188,463 A * | 2/1993 | Heinrich | F04D 29/047 384/271 |
| 5,201,585 A | 4/1993 | Gans et al. | |
| 5,603,574 A | 2/1997 | Ide et al. | |
| 5,647,828 A * | 7/1997 | Chen | B60B 37/00 301/111.02 |
| 5,651,616 A * | 7/1997 | Hustak | F01D 25/164 384/119 |
| 7,628,542 B2 | 12/2009 | Wada et al. | |
| 8,083,413 B2 | 12/2011 | Ertas | |
| 8,182,153 B2 | 5/2012 | Singh et al. | |
| 8,834,027 B2 | 9/2014 | Zeidan | |
| 9,033,653 B2 | 5/2015 | Coffin et al. | |
| 9,684,146 B2 * | 6/2017 | Marcinuk | G02B 7/008 |
| 2002/0129676 A1* | 9/2002 | Lin | B62M 3/003 74/594.1 |
| 2009/0148274 A1* | 6/2009 | Kostka | F01D 25/164 415/170.1 |
| 2011/0130246 A1 | 6/2011 | McCune et al. | |
| 2014/0193245 A1* | 7/2014 | Morreale | F01D 25/164 415/170.1 |

* cited by examiner

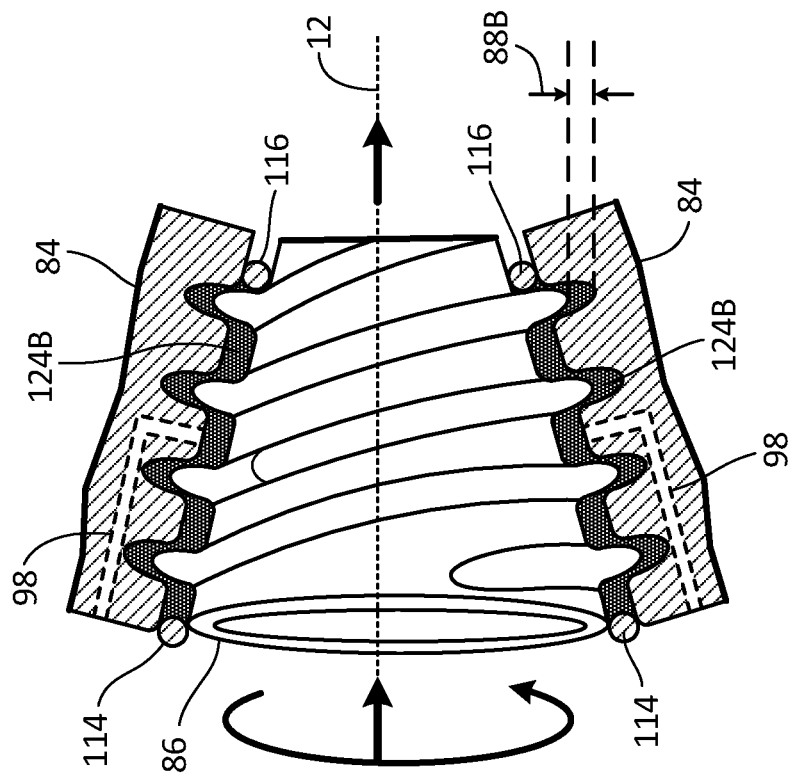
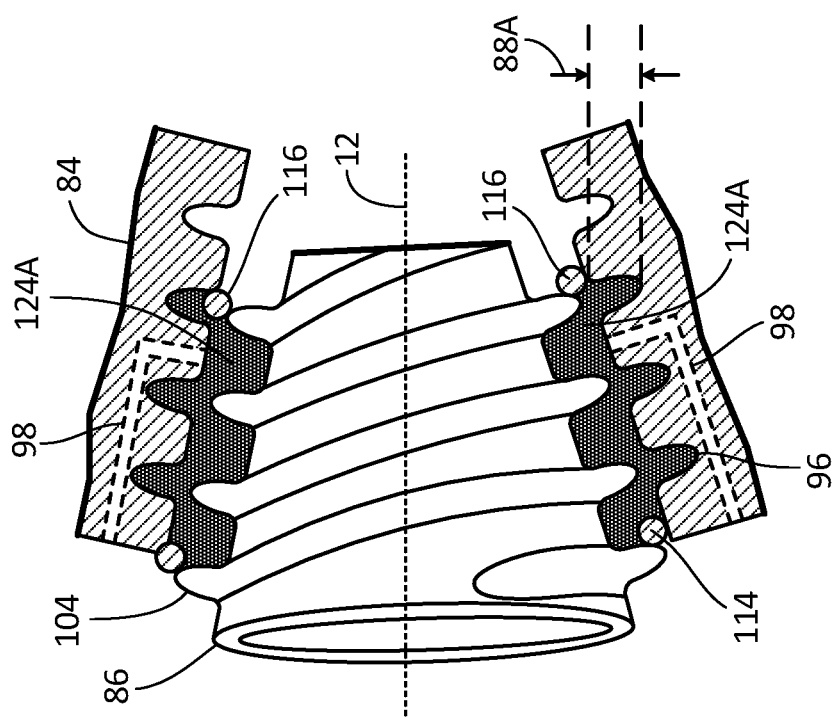
Fig. 4B
Fig. 4A

HELICALLY ACTUATED VARIABLE BEARING DAMPER

BACKGROUND

The present invention relates to gas turbine engines. More particularly, the present invention relates to vibration damping for a bearing support assembly for a gas turbine engine.

A gas turbine engine includes rotating spools or rotor shafts with blades that compress air needed for operation. One of the major goals in gas turbine engine fabrication is to optimize efficiency of the compressor and the turbine so that work is not lost. Tip leakage between the blades and the surrounding case is a significant source of engine inefficiency.

At shut-down of the gas turbine engine, the engine may cool unevenly. For example, the bottom part of the engine usually cools more quickly than the top portion of the engine as the heat within the engine migrates radially outward. This temperature differential in the gas turbine engine can cause the rotor shafts to distort and become eccentric relative to an engine center axis, taking on an effectively arcuate shape instead of being generally cylindrical. This phenomenon is also known as the "bowed rotor effect." A "bowed" rotor shaft is problematic at engine start-up because the distortions in the rotor shaft may result in the blades rubbing into the surrounding case or rub strip thereby creating larger gaps between the blade tips and the surrounding case and increasing tip leakage and engine inefficiency. In some cases, the eccentric movement of the bowed rotor shaft can also create gaps between many of the components in the compressor and/or turbine sections of the gas turbine engine that can also cause air leakage and decrease engine efficiency. In addition to increasing tip leakage and engine inefficiency, a bowed rotor can also create noise and vibrations felt in the airplane at start-up.

Squeeze film dampers can be used in a bearing support assembly that supports a rotatable shaft of a gas turbine engine for vibration reduction. The bearing is contained within a stationary housing. A bearing centering spring, also known as a squirrel cage, supports the bearing. The squirrel cage is connected to the stationary housing such that the squirrel cage does not rotate relative to the stationary housing, yet the squirrel cage is flexible enough to bend in response to loads experienced from the bearing. A film of liquid, such as oil, is supplied to an annulus disposed between the stationary housing and the squirrel cage. The film of oil reduces or damps engine vibration and the transmission of vibrations from the bearing to the engine structure.

When the compressor or turbine shaft rotates, imbalance or rotor instabilities can cause excessive whirling of the shaft and vibration of the engine, engine mounts and airframe. As a speed of the shaft increases, the rotating shaft passes through a variety of critical speeds, which occur when the speed of the rotating shaft traverses a resonant frequency of one of the various structures of the engine. Due to the multitude of structures that make up any given engine, the rotating shaft passes through several critical speeds as the rotating shaft accelerates. As the rotating shaft rotates, the rotating shaft may be displaced from a centerline of the engine. The rotating shaft then whirls about a centerline of the engine. As the bearing moves with the rotation of the shaft, the squirrel cage vibrates within the stationary housing and squeezes the oil in the annulus.

Typical fluid film bearing dampers have a fixed geometry, which causes inefficiencies with regards to bearing stability and transmission of vibrations due to a set film depth only accommodating a single operating condition. These existing bearing dampers are limited to occupying an on or off state based on being supplied with oil.

SUMMARY

A bearing damper assembly for a bearing compartment of a gas turbine engine includes a squirrel cage, a bearing support, an outer sleeve, and an inner sleeve. The bearing support is disposed radially outward from a portion of the squirrel cage. The outer sleeve extends axially from the bearing support. The inner sleeve is attached to the squirrel cage and is disposed radially inward from the outer sleeve. An outward surface of the inner sleeve has a first contoured portion having a first axially extending contour and an inner surface of the outer sleeve has a second contoured portion having a second axially extending contour. The outward surface of the inner sleeve and the inner surface of the outer sleeve define a gap extending between the first contoured portion and the second contoured portion. The gap forms a fluid damper.

A method of controlling a width of a fluid damper in a gap between an inner sleeve and an outer sleeve includes supplying the fluid damper to the gap between the inner and outer sleeves. The inner sleeve is moved relative to the outer sleeve to vary a size of the gap between the inner sleeve and the outer sleeve and thereby causes the width of the damper to change.

A gas turbine engine includes a bearing compartment and a bearing damper assembly disposed in the bearing compartment. The bearing damper assembly includes a squirrel cage, a bearing support, an outer sleeve, and an inner sleeve. The bearing support is disposed radially outward from a portion of the squirrel cage. The outer sleeve extends axially from the bearing support. The inner sleeve is attached to the squirrel cage and is disposed radially inward from the outer sleeve. An outward surface of the inner sleeve has a first contoured portion having a first axially extending contour and an inner surface of the outer sleeve has a second contoured portion having a second axially extending contour. The outward surface of the inner sleeve and the inner surface of the outer sleeve define a gap extending between the first contoured portion and the second contoured portion. The gap forms a fluid damper.

BRIEF DESCRIPTION OF THE DRAWINGS

FIG. 4A is a partial cross-section view of a first sleeve and a second sleeve in a first position.

FIG. 4B is a partial cross-section view of the first sleeve and the second sleeve in a second position.

DETAILED DESCRIPTION

The proposed fluid film bearing damper assembly enables a variable gap width of the damper. A helical sleeve attached to a squirrel cage threadably engages with a grooved element attached to the bearing support enabling the width of the gap between the helical sleeve and the grooved element to be adjusted by rotating the helical sleeve into or out of the grooved element. The variable width of the fluid film damper enables the damping coefficient of the damper to be adjusted for a particular mode (e.g., operational, vibrational, etc.) of the engine. For example, a bowed rotor start upon start-up of the engine requires a smaller width of the fluid film damper with minimal clearance of the oil film, while a centered rotor during engine cruising requires a larger gap. The benefit of the variable gap is the reduction in start-up time of the engine due to the width of the fluid film annulus being adjusted to the most efficient value upon start-up or during operation of the engine.

Figure 1:
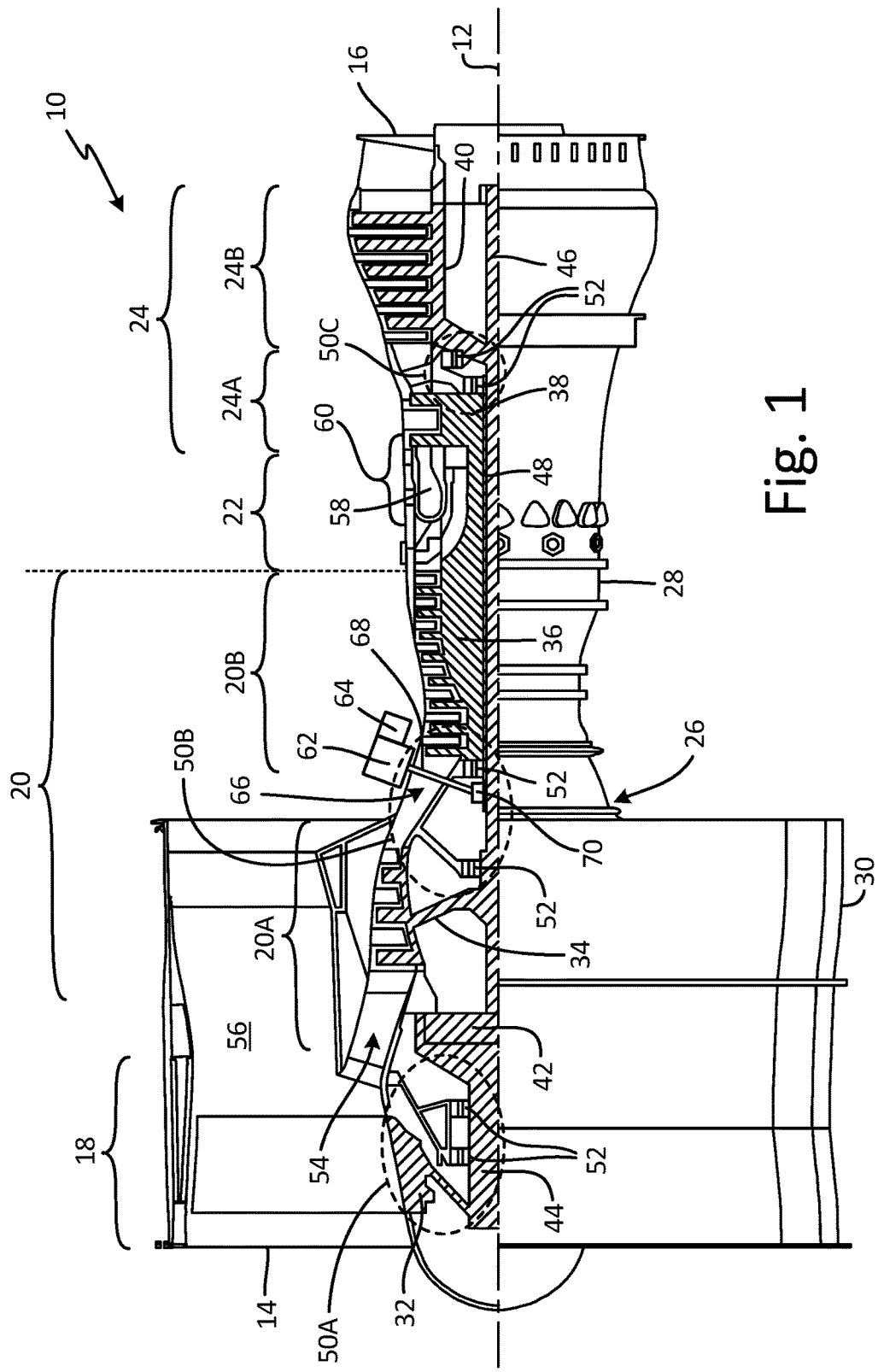
FIG. 1 is a side partial cross-section view of a turbine engine.

FIG. 1 shows a side elevation cutaway view of gas turbine engine 10 and includes axial centerline 12, upstream airflow inlet 14, downstream airflow exhaust 16, fan section 18, compressor section 20 (with low pressure compressor ("LPC") section 20A and high pressure compressor ("HPC") section 20B), combustor section 22, turbine section 24 (with high pressure turbine ("HPT") section 24A and low pressure turbine ("LPT") section 24B), engine housing 26 (with inner case 28 (e.g., a core case) and outer case 30 (e.g., a fan case)), fan rotor 32, LPC rotor 34, HPC rotor 36, HPT rotor 38, LPT rotor 40, gear train 42, fan shaft 44, low speed shaft 46, high speed shaft 48, bearing compartments 50A, 50B, and 50C, plurality of bearings 52, core gas path 54, bypass gas path 56, combustion chamber 58, and combustor 60. In one non-limiting embodiment, gas turbine engine 10 can include either axial turbines, radial turbines, and/or combinations thereof. External components and a gearbox have been removed for clarity and are not shown in FIG. 1

Gas turbine engine 10 extends along axial centerline 12 between upstream airflow inlet 14 and downstream airflow exhaust 16. Gas turbine engine 10 includes fan section 18, compressor section 20, combustor section 22, and turbine section 24. Compressor section 20 includes LPC section 20A and HPC section 20B. Turbine section 24 includes HPT section 24A and LPT section 24B. In one non-limiting embodiment, turbine section 24 can include either axial turbines, radial turbines, and/or combinations thereof.

Fan section 18, compressor section 20, combustor section 22, and turbine section 24 are arranged sequentially along centerline 12 within engine housing 26. Engine housing 26 includes inner case 28 (e.g., a core case) and outer case 30 (e.g., a fan case). Inner case 28 may house one or more of fan section 18, compressor 20, combustor section 22, and turbine section 24 (e.g., an engine core). Outer case 30 may house at least fan section 18. In another non-limiting embodiment, gas turbine engine 10 can include open rotors. Each of gas turbine engine sections 18, 20A, 20B, 24A and 24B includes respective rotors 32-40. Each of these rotors 32-40 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

Fan rotor 32 is connected to gear train 42, for example, through fan shaft 44. Gear train 42 and LPC rotor 34 are connected to and driven by LPT rotor 40 through low speed shaft 46. In another non-limiting embodiment, a gear box can be included driving the fan. The combination of at least LPC rotor 34, LPT rotor 40, and low speed shaft 46 may be referred to as "a low speed spool." HPC rotor 36 is connected to and driven by HPT rotor 38 through high speed shaft 48. The combination of at least HPC rotor 36, HPT rotor 38, and high speed shaft 48 may be referred to as "a high speed spool." Shafts 44-48 are rotatably supported by a plurality of bearings 52, which can be rolling element bearings, thrust bearings, or other types of bearings. Each of these bearings 52 is connected to engine housing 26 by at least one stationary structure such as, for example, an annular support strut.

During operation, air enters gas turbine engine 10 through airflow inlet 14. Air is directed through fan section 18 and is then split into either core gas path 54 or bypass gas path 56. Core gas path 54 flows sequentially through fan section 18, compressor section 20, combustor section 22, and turbine section 24. The air within core gas path 54 may be referred to as "core air." Bypass gas path 56 flows through a duct between inner case 28 and outer case 30. The air within bypass gas path 56 may be referred to as "bypass air."

The core air is compressed by LPC rotor 34 and HPC rotor 36 and directed into combustion chamber 58 of combustor 60 in combustor section 22. Fuel is injected into combustion chamber 58 and mixed with the core air that has been compressed by compressor section 20 to provide a fuel-air mixture. This fuel-air mixture is ignited and combustion products thereof expand and flow through and sequentially cause HPT rotor 38 and LPT rotor 40 to rotate. The rotations of HPT rotor 38 and LPT rotor 40, respectively drive rotation of LPC rotor 34 and HPC rotor 36 and compression of the air received from core gas path 54. The rotation of LPT rotor 40 also drives rotation of fan rotor 32, which propels bypass air through and out of bypass gas path 56. The propulsion of the bypass air may account for a majority of thrust generated by gas turbine engine 10, which can be more than 75% of engine thrust. Gas turbine engine 10 of the present disclosure, however, is not limited to the foregoing exemplary thrust ratio.

Figure 2:
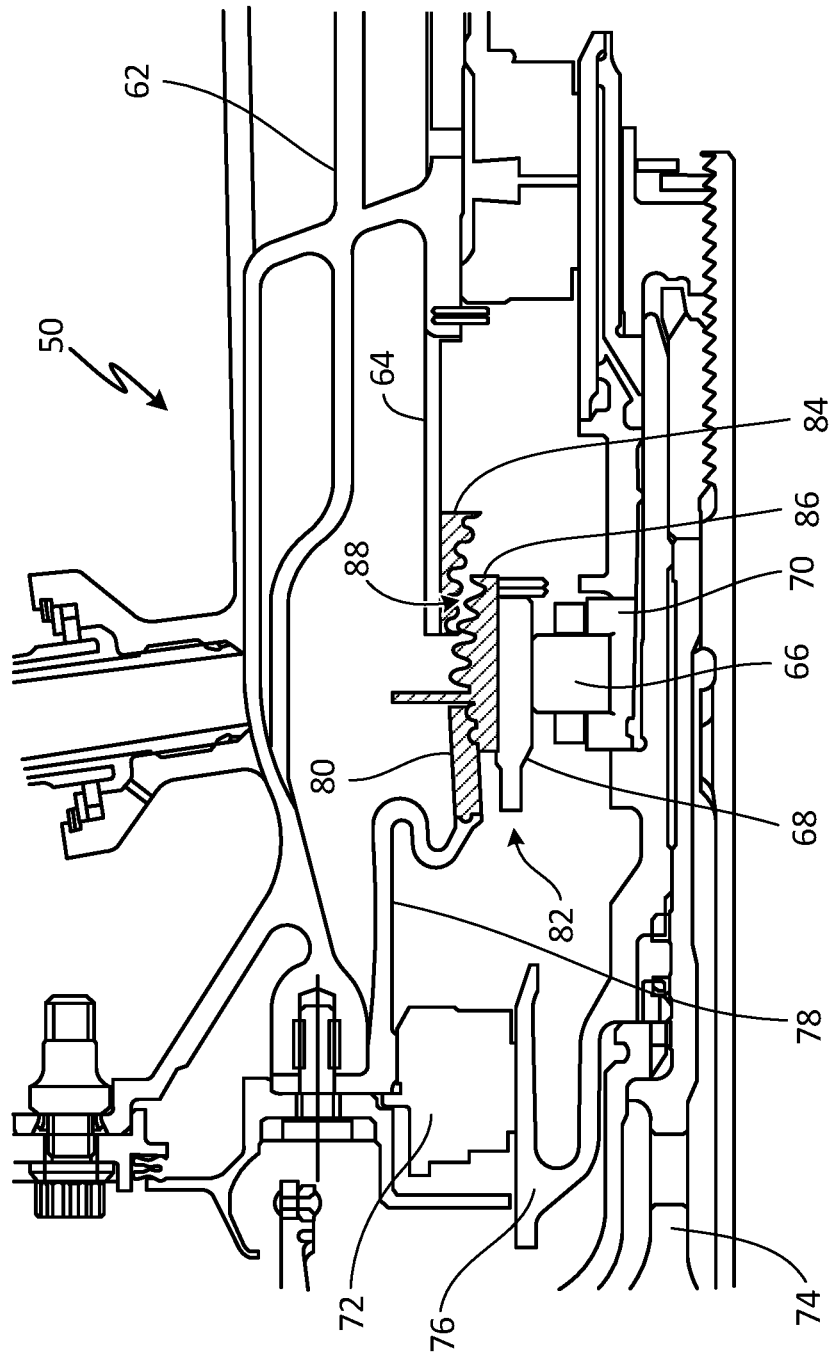
FIG. 2 is a cross-section view of a bearing compartment of the gas turbine engine.

FIG. 2 is a cross-section view of bearing compartment 50 of gas turbine engine 10. Bearing compartment 50 is representative of any of bearing compartments 50A, 50B, and 50C of gas turbine engine 10. It is to be understood that the following discussion of bearing compartment 50 is applicable to any bearing compartment (e.g., 50A, 50B, or 50C) of gas turbine engine 10 or another type of engine. FIG. 2 shows bearing compartment 50, bearing housing 62 (including bearing support 64), roller bearing 66, outer race 68, inner race 70, carbon seal 72, rotor shaft 74, seal runner 76, squirrel cage 78 (including aft end 80), and bearing damper assembly 82 (including outer sleeve 84, inner sleeve 86, and gap 88.

Bearing housing 62 is a housing of bearing compartment 50. Bearing support 64 is an annular extension of bearing housing 62. Bearing support 64 can be formed from any metal, such as steel, titanium, nickel, and/or non-metallic materials where temperatures allow, which provides the necessary thermal and mechanical durability and elasticity required for the applications of bearing support 64. Roller bearing 66 is a bearing element in the form of a roller or ball. Outer race 68 and inner race 70 are concentric annular bands.

Carbon seal 72 is depicted as an annular seal element, though many other styles of seals can be incorporated. Rotor shaft 74 is a rotating shaft. Seal runner 76 is an annular bracket element. Squirrel cage 78 is a generally annular bracket element of solid material. In one non-limiting embodiment, squirrel cage 78 is metallic, and can be made from materials such as titanium, a titanium alloy, nickel, or a nickel alloy. During operation, squirrel cage 78 is bathed in oil that is typically about 350° F. (177° C.), and squirrel cage 78 is thus made of a material that can withstand such temperatures. Aft end 80 is a downstream end of squirrel cage 78.

Bearing damper assembly 82 is an assembly including outer sleeve 84, inner sleeve 86, and gap 88. Outer sleeve 84 and inner sleeve 86 are annular bands of solid material. In other non-limiting embodiments, advanced manufacturing processes, such as layer-by-layer additive manufacturing, can allow for a multi-piece assembly. Gap 88 is a generally annular passage or space between outer and inner sleeves 84 and 86. An example of a bearing compartment with a squirrel cage and a bearing assembly is disclosed in U.S. patent application Ser. No. 14/742,766, filed Jun. 18, 2015, entitled BEARING SUPPORT DAMPING and published as U.S. Patent Application Publication No. 2016/0369652A1, which is herein incorporated by reference in its entirety.

Bearing housing 62 is spaced radially outward from rotor shaft 74 so as to form bearing compartment 50. Bearing support 64 is disposed radially within bearing compartment 50 and is connected to bearing housing 62. Bearing support 64 is disposed radially outward from and is connected to outer sleeve 84. Roller bearing 66 is disposed radially between outer and inner races 68 and 70. Roller bearing 66 is configured to roll relative to outer race 68 and inner race 70 during relative rotation between outer and inner races 68 and 70.

Outer race 68 is disposed radially inward of outer sleeve 84 and inner race 70 is disposed radially inward of outer race 68. Carbon seal 72 is disposed radially outward from and is slidably engaged with seal runner 76. Rotor shaft 74 is configured to rotate relative to bearing housing 62. Seal runner 76 is disposed radially inward of carbon seal 72.

Squirrel cage 78 is disposed radially inward of bearing housing 62 and positioned axially forward of bearing support 64. Squirrel cage 78 is disposed radially outward from bearing damper assembly 82. Squirrel cage 78 is supported by bearing housing 62. Aft end 80 of squirrel cage 78 is connected to and engaged with inner sleeve 86. Squirrel cage 78 radially supports and provides damping for roller bearing 66.

Bearing damper assembly 82 is disposed in bearing compartment 50. In one non-limiting embodiment, bearing damper assembly 82 supports a rotatable shaft, such as a compressor or turbine shaft of gas turbine engine 10. In another non-limiting embodiment, bearing damper assembly can be representative of bearing 52 shown in FIG. 1 or another bearing within any of bearing compartments 50A, 50B, or 50C. Outer sleeve 84 is disposed radially within and is connected to bearing support 64. Outer sleeve 84 is rotatably engaged with inner sleeve 86 (as will be discussed further with respect to FIGS. 3-6). Outer sleeve 84 can be at least partially nested in bearing support 64 such that outer sleeve 84 is disposed radially inward of bearing support 64.

Inner sleeve 86 is disposed radially outward from outer race 68 and radially inward from aft end 80 of squirrel cage 78 and from outer sleeve 84. An upstream portion of inner sleeve 86 is disposed radially inward of squirrel cage 78 and is connected to aft end 80 of squirrel cage 78. Gap 88 extends radially between outer sleeve 84 and inner sleeve 86. In this non-limiting embodiment, gap 88 is not shown to scale, can be larger or smaller than shown in FIG. 3, and can include a size of 0.0-0.050 inches (0.0-0.127 centimeters). In another non-limiting embodiment, a size of gap 88 can be 0.001 to 0.015 inches (0.0254 to 0.381 millimeters).

During operation of gas turbine engine 10, rotating shafts of gas turbine engine 10 pass through several critical speeds as they accelerate. For example, a critical speed is experienced when a rotational frequency of the rotating shaft traverses a resonance frequency of one of the various structures of gas turbine engine 10. Due to the variety of structures that make up gas turbine engine 10, the rotating shafts can pass through a multitude of critical speeds during acceleration. As the rotating shafts rotate, centerlines of the rotating shafts may be displaced from axial centerline 12 of gas turbine engine 10. When displaced, the rotating shafts whirl about axial centerline 12 of the engine, thereby causing vibrations throughout gas turbine engine 10 and, in particular, in squirrel cage 78. As will be discussed with respect to FIGS. 3-6, these vibrations are damped by a fluid-film damper, whereby a supply of oil provided to gap 88 acts as a damper to reduce the transmissibility of vibrations between the structure of bearing compartment 50.

Figure 3:
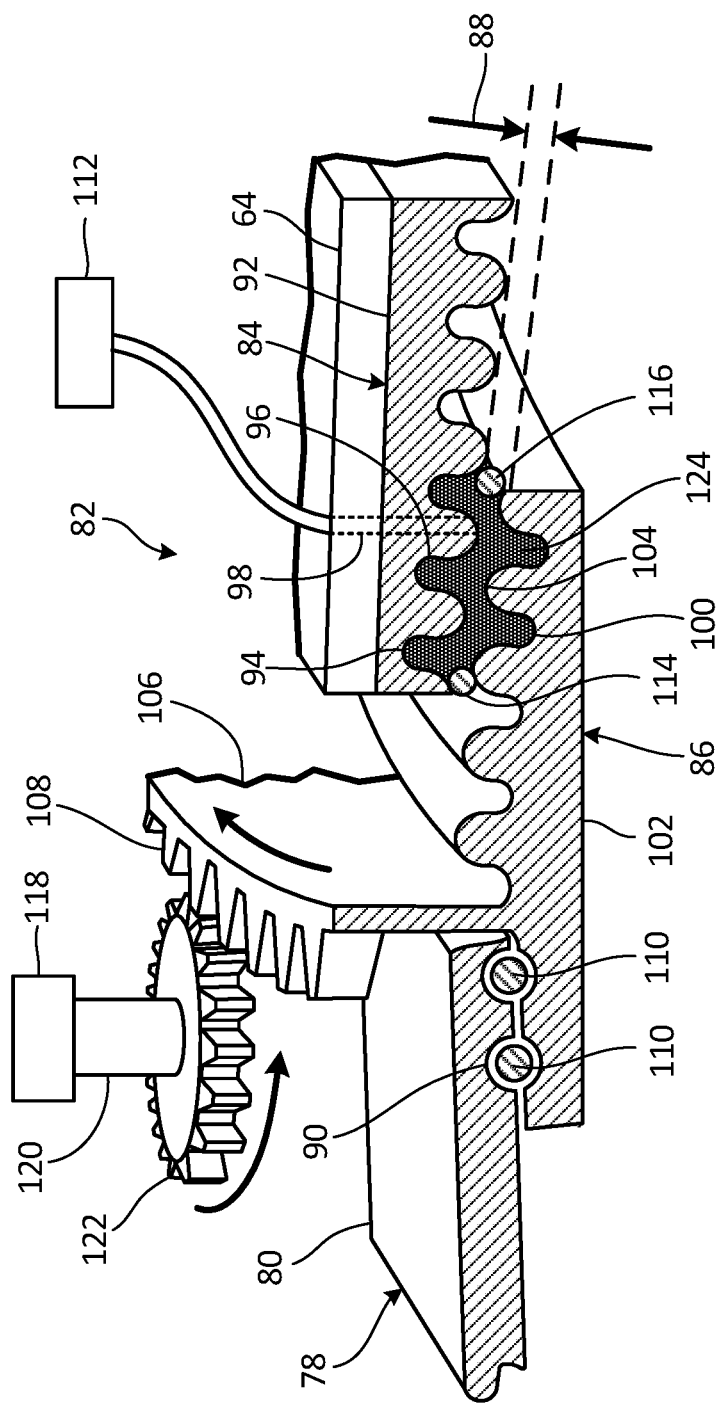
FIG. 3 is a perspective cross-section view of a squirrel cage and a bearing damper assembly.

FIG. 3 is a perspective cross-section view of squirrel cage 78 and bearing damper assembly 82. FIG. 3 shows bearing support 64, squirrel cage 78 (including aft end 80 and grooves 90), outer sleeve 84 (including outer surface 92, inner surface 94, grooves 96, and oil supply passage 98), inner sleeve 86 (including outer surface 100, inner surface 102, threads 104, and radial wall 106 with teeth 108), gap 88, ball bearings 110, fluid source 112, first seal 114, second seal 116, driver 118 (including shaft 120 and gear 122), and fluid film damper 124.

Grooves 90 are channels forming a helical groove or passage in aft end 80 of squirrel cage 78. Outer surface 92 and inner surface 94 are radially outward and radially inward facing circumferential surfaces of outer sleeve 84, respectively. Grooves 96 are channels forming a helical groove or passage in outer sleeve 84. Oil supply passage 98 is a passage or channel configured to transport a fluid. Outer surface 100 and inner surface 102 are radially outward and radially inward facing circumferential surfaces of inner sleeve 86, respectively.

Threads 104 are helical extensions in inner sleeve 86. Radial wall 106 is an annular band. Teeth 108 are projections of solid material. Ball bearings 110 are bearing elements in the form of balls. Fluid source 112 is a source of fluid such as oil, water, or air. First and second seals 114 and 116 are annular rings configured to form a sealing interface. Driver 118 is a mechanism configured to create torque. In one non-limiting embodiment, driver 118 can include a servo motor. In another non-limiting embodiment, driver 118 can include a piston. Shaft 120 is an elongated cylinder. Gear 122 is a generally circular toothed wheel. Fluid film damper 124 is a fluid film annulus that can include oil, water, or air.

An example of a fluid damper bearing assembly with an oil supply is disclosed in U.S. patent application Ser. No. 15/240,248, filed Aug. 18, 2016, entitled RESILIENT BEARING MOUNT WITH INTEGRAL DAMPER FLUID PASSAGE FOR A GEARED TURBOFAN ENGINE, which is herein incorporated by reference in its entirety.

Grooves 90 are formed in (e.g., cut out of) aft end 80 of squirrel cage 78 along a radially inward face of aft end 80. Outer surface 92 of outer sleeve 84 is disposed radially inward from and is connected to bearing support 64. Inner surface 94 of outer sleeve 84 is disposed radially outward from a portion of inner sleeve 86. As will be discussed further with FIGS. 4A-4B, inner surface 94 of outer sleeve 84 also includes a taper in the axial direction such that a diameter of inner surface 94 decreases along a downstream or aft direction (e.g., left to right in FIG. 3). Grooves 96 are formed in outer sleeve 84 and form a helical passageway extending circumferentially along inner surface 94 of outer sleeve 84. Grooves 96 receive threads 104 of inner sleeve 86.

Oil supply passage 98 extends through bearing support 64 and through outer sleeve 84. Oil supply passage 98 fluidly connects fluid source 112 to gap 88 to supply oil to gap 88. In one non-limiting embodiment, oil supply passage 98 includes valving (not shown) for selectively controlling the supply of oil to gap 88. Outer surface 100 of inner sleeve 86 is disposed on a radially outward facing surface of inner sleeve 86. As will be discussed further with FIGS. 4A-4B, outer surface 100 of inner sleeve 86 also includes a taper in the axial direction such that a diameter of outer surface 100 decreases along a downstream or aft direction. Inner surface 102 of inner sleeve 86 is disposed on a radially inward facing surface of inner sleeve 86.

Threads 104 insert into and are threadably engaged with grooves 96 of outer sleeve 84. Radial wall 106 extends radially outward from and is connected to inner sleeve 86. Teeth 108 extend axially from and are connected to radial wall 106. Teeth 108 engage with gear 122 of driver 118 to form a geared interface with gear 122. Ball bearings 110 are disposed between aft end 80 of squirrel cage 78 and inner sleeve 86. Particularly, ball bearings 110 are disposed in grooves 90 of aft end 80. Ball bearings 110 are slidably and/or rotatably engaged with aft end 80 of squirrel cage 78 and with inner sleeve 86.

First seal 114 extends radially between inner surface 94 of outer sleeve 84 and outer surface 100 of inner sleeve 86. First seal 114 is disposed at an axially forward end of outer sleeve 84 and axially forward of gap 88. First seal 114 forms a sealing interface between inner surface 94 of outer sleeve 84 and outer surface 100 of inner sleeve 86. First seal 114 defines an axially forward end of gap 88. Second seal 116 extends radially between inner surface 94 of outer sleeve 84 and outer surface 100 of inner sleeve 86. Second seal 116 is disposed at an axially aft end of inner sleeve 86 and axially aft of gap 88. Second seal 116 forms a sealing interface between inner surface 94 of outer sleeve 84 and outer surface 100 of inner sleeve 86. Second seal 116 defines an axially aft end of gap 88. First and second seals 114 and 116 are not limited to those shown in FIG. 2 or to the types discussed herein.

Driver 118 is connected or attached to bearing housing 62 (shown in FIG. 2). Shaft 120 is connected to and rotatable engaged with driver 118. Gear 122 is attached to a portion of shaft 120 and is engaged or meshed with teeth 108 of radial wall 106. Fluid film damper 124 is disposed in gap 88, radially between outer sleeve 84 and inner sleeve 86, and axially between first seal 114 and second seal 116.

Fluid film damper 124 is configured to dampen relative vibrations between inner sleeve 86 and outer sleeve 84 by absorbing the vibrations. Driver 118 is configured to drive relative motion between inner sleeve 86 and outer sleeve 84. In one non-limiting embodiment, driver 118 includes a servo motor configured to rotate inner sleeve 86 relative to outer sleeve 84. In another non-limiting embodiment, driver 118 can include a piston configured to axially translate inner sleeve 86 relative to outer sleeve 84.

During start-up of gas turbine engine 10, fluid film damper 124 is activated when pressurized oil is directed by fluid source 112, through oil supply passage 98, and into gap 88 between outer sleeve 84 and inner sleeve 86. The pressurized oil then travels between outer sleeve 84 and inner sleeve 86 until reaching first seal 114 and second seal 116. Once the pressurized oil reaches first seal 114 and second seal 116, first seal 114 and second seal 116 stop the advancement of the pressurized oil and causes back-pressure to form in the oil between outer sleeve 84 and inner sleeve 86. This back-pressure in the oil pushes inner sleeve 86 radially inward against outer race 68 (shown in FIG. 2). Fluid film damper 124 can continue to push inner sleeve 86 radially inward against outer race 68 after engine start-up and throughout engine operation. Because fluid film damper 124 presses inner sleeve 86 radially inward against outer race 68 during engine start-up and operation, fluid film damper 124 reduces radial play and radial slop in roller bearing 66 (shown in FIG. 2), squirrel cage 78, and bearing damper assembly 82.

In this way, bearing damper assembly 82 includes fluid film damper 124, whereby the oil of fluid film damper 124 is disposed in gap 88 and damps vibrations to reduce the rotor vibration and the transmission of vibrations from bearing damper assembly 82 to bearing support 64 of bearing housing 62. As rotor shaft 74 rotates, vibrations experienced by rotor shaft 74 are transmitted to bearing housing 62 through bearing damper assembly 82. Due to the motion of rotor shaft 74, bearing damper assembly 82 vibrates within bearing housing 62. The motion of bearing damper assembly 82 squeezes the oil of fluid film damper 124 in gap 88, and the oil of fluid film damper 124 in gap 88 reduces the vibrations experienced from rotating rotor shaft 74. During operation the oil slowly leaks out of gap 88. As such, a constant supply of oil must be provided to gap 88 to maintain fluid film damper 124. In some non-limiting embodiments, a small amount of oil leakage can be tolerated by design.

Bearing damper assembly 82 is configured to control the size of gap 88 in response to relative rotation between inner sleeve 86 and outer sleeve 84. Upon engagement of driver 118, shaft 120 with gear 122 rotates thereby causing teeth 108 of radial wall 106 to rotate and driving radial wall 106. As radial wall 106 is rotatably driven by driver 118, inner sleeve 86 rotates relative to outer sleeve 84. As inner sleeve 86 rotates relative to outer sleeve 84, inner sleeve 86 moves in an axial direction relative to outer sleeve 84 by way of threaded engagement between threads 104 of inner sleeve 86 and grooves 96 of outer sleeve 84. As inner sleeve 86 moves axially relative to outer sleeve 84, a size of gap 88 is varied by way of outer sleeve 84 and inner sleeve 86 being tapered, thereby causing a width of fluid film damper 124 to change. As the width of fluid film damper 124 changes, a damping force coefficient of fluid film damper 124 is adjusted in response to varying the width of fluid film damper 124.

In one non-limiting embodiment, as inner sleeve 86 rotates relative to outer sleeve 84, inner sleeve 86 moves in an axially aft direction (e.g., left to right in FIG. 3) relative to outer sleeve 84 by way of threaded engagement between threads 104 of inner sleeve 86 and grooves 96 of outer sleeve 84. As inner sleeve 86 moves in the axially aft direction relative to outer sleeve 84, a size of gap 88 decreases and thereby causes a width of fluid film damper 124 to decrease. As the width of fluid film damper 124 decreases, the damping force coefficient of fluid film damper 124 is increased.

In another non-limiting embodiment, as inner sleeve 86 rotates relative to outer sleeve 84, inner sleeve 86 moves in an axially forward direction (e.g., right to left in FIG. 3) relative to outer sleeve 84 by way of threaded engagement between threads 104 of inner sleeve 86 and grooves 96 of outer sleeve 84. As inner sleeve 86 moves in the axially forward direction relative to outer sleeve 84, a size of gap 88 increases and thereby causes a width of fluid film damper 124 to increase. In this non-limiting embodiment, gap 88 is not shown to scale, can be larger or smaller than shown in FIG. 3, and can include a size of 0.0-0.050 inches (0.0-0.127 centimeters). In another non-limiting embodiment, a size of gap 88 can be 0.001 to 0.015 inches (0.0254 to 0.381 millimeters). As the width of fluid film damper 124 increases, the damping force coefficient of fluid film damper 124 is decreased.

In one non-limiting embodiment, driver 118 can be controlled by a full authority digital engine control or an electronic engine controller connected to gas turbine engine 10. The size of gap 88 between outer sleeve 84 and inner sleeve 86, and thus the width of fluid film damper 124, can be controlled (e.g., via driver 118) is response to a signal indicating the amount of vibration experienced by an element of bearing compartment 50 or more generally gas turbine engine 10. The size of gap 88 and the width of fluid film damper 124 can also be controlled as a function of engine speed of gas turbine engine 10 such that gap 88 is varied based upon a range of engine speeds from start-up to shut-down. Gap 88 and fluid film damper 124 can also be controlled by at least one of an open-loop control system, closed-loop control system, feedback control system, proportional-integral-derivative controller, or other control loop feedback mechanisms. Proximity probes and/or sensors can be disposed in, on, and/or around bearing damper assembly 82 (e.g., in gap 88) and its components to measure a snapshot of the size of gap 88.

In this way, the damping force coefficient of fluid film damper 124 can be adjusted to suit varying operation modes of gas turbine engine 10 and bearing compartment 50. In the instance of a bowed rotor start, a relatively small clearance of gap 88 and fluid film damper 124 is desirable upon start-up of gas turbine engine 10 to manage a first set of vibrational modes. During other operational stages of gas turbine engine 10, such as during cruising, a different size of gap 88 and fluid film damper 124 is desirable to provide a different damping force coefficient of fluid film damper 124 to manage a different set of vibrational modes. Bearing damper assembly 82 provides the capability to vary the size of gap 88 and width of fluid film damper 124 thereby allowing the damping force coefficient of fluid film damper 124 to be varied depending on the particular operating condition or flight mode of gas turbine engine 10. The ability to vary the damping force coefficient of fluid film damper 124 will decrease start-up times of gas turbine engine 10.

FIG. 4A is a partial cross-section view of outer sleeve 84 and inner sleeve 86 in a first position. FIG. 4B is a partial cross-section view of outer sleeve 84 and inner sleeve 86 in a second position. FIG. 4A shows outer sleeve 84, inner sleeve 86, gap 88A, grooves 96, oil supply passages 98, threads 104, first seal 114, second seal 116, and fluid damper 124A, with outer sleeve 84, first seal 114, second seal 116, and fluid film damper 124A shown in cross-section. FIG. 4B shows outer sleeve 84, inner sleeve 86, gap 88B, grooves 96, oil supply passages 98, threads 104, first seal 114, second seal 116, and fluid damper 124B, with outer sleeve 84, first seal 114, second seal 116, and fluid film damper 124B shown in cross-section. FIGS. 4A and 4B will be discussed concurrently. In another non-limiting embodiment, one or more oil return passages can extend around or through either of outer sleeve 84 and/or inner sleeve 86.

In FIG. 4A, inner sleeve 86 occupies a first position relative to outer sleeve 84, thereby forming gap 88A with a first size. In one non-limiting embodiment, the first size of gap 88A can be 0.015 inches (0.381 millimeters). Fluid film damper 124A includes a first radial thickness equivalent to the first size of gap 88A and therefore a first damping force coefficient.

Upon rotation of inner sleeve 86 (e.g., as described with respect to FIG. 3), inner sleeve 86 translates or moves axially aft relative to outer sleeve 84. In one non-limiting embodiment, axially translating inner sleeve 86 includes actuating inner sleeve 86 with an electro-mechanical motor or with driver 118 (as shown in FIG. 3). In another non-limiting embodiment, moving inner sleeve 86 relative to outer sleeve 84 includes rotating inner sleeve 86 via threadable engagement relative to outer sleeve 84.

Due to the tapered configuration of outer sleeve 84 and inner sleeve 86, as inner sleeve 86 moves axially aft relative to outer sleeve 84, gap 88A is reduced or decreased down to gap 88B. Inner sleeve 86 occupies a second position relative to outer sleeve 84 thereby forming gap 88B with a second size. In one non-limiting embodiment, the second size of gap 88B can be 0.005 inches (0.127 millimeters). Fluid film damper 124B includes a second radial thickness equivalent to the second size of gap 88B and therefore a second damping force coefficient that is different from the first damping force coefficient of fluid film damper 124A. It is to be understood that the above process can be reversed to increase gap 88A (and/or 88B) to produce a fluid film damper larger than either fluid film damper 124B (and/or 124A).

In this way, the damping force coefficient of fluid film damper 124 can be adjusted to suit varying operation modes of gas turbine engine 10 and bearing compartment 50.

Figure 5:
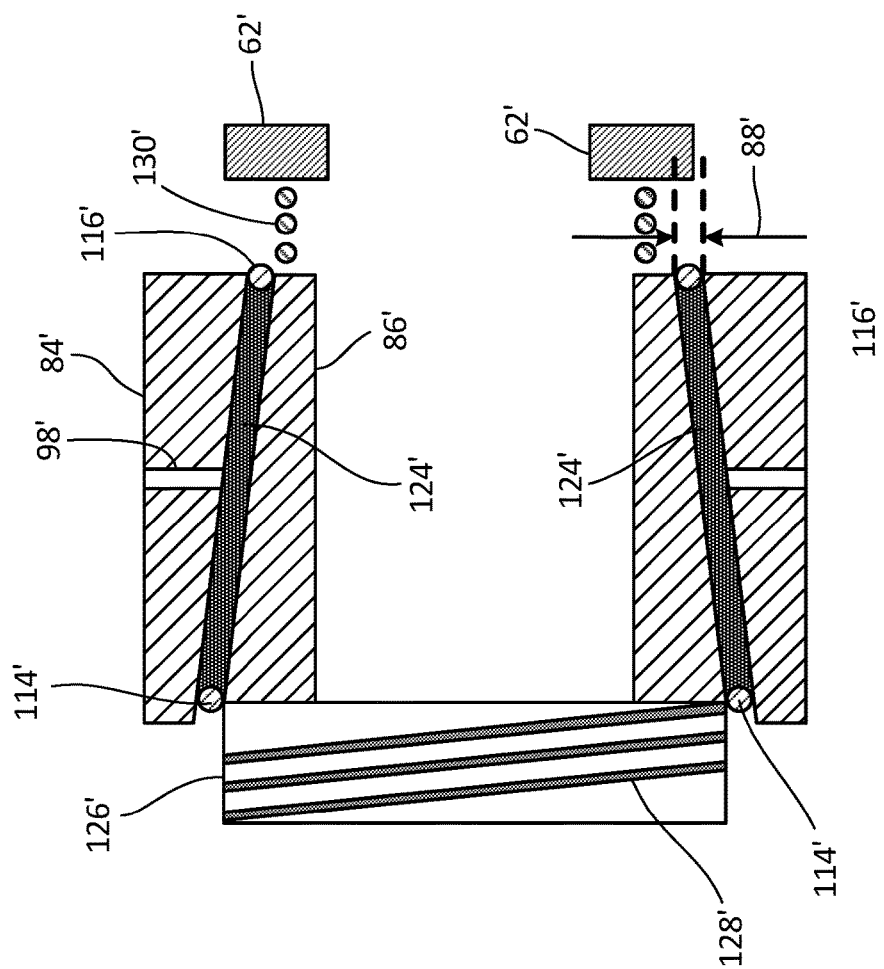
FIG. 5 is a partial cross-section view of a first sleeve with a threaded portion and a second sleeve.

FIG. 5 is a partial cross-section view of bearing housing 62', outer sleeve 84', inner sleeve 86' (with threaded portion 126' including threads 128'), gap 88', oil supply passage 98', first seal 114', second seal 116', fluid damper 124', and resilient element 130'.

Outer sleeve 84' is similar to outer sleeve 84 discussed above with reference to FIGS. 2-4B, except that outer sleeve 84' does not include grooves or threads for threadable engagement with inner sleeve 86'. Inner sleeve 86' is similar to inner sleeve 86 discussed above with reference to FIGS. 2-4B, except that inner sleeve 86' does not include grooves or threads for threadable engagement with outer sleeve 84'. Gap 88' extends radially between outer sleeve 84' and inner sleeve 86'. Oil supply passage 98' is a fluidic passageway extending through outer sleeve 84' and fluidly connects gap 88' to a supply of fluid such as oil.

First seal 114' is an annular seal element disposed between outer sleeve 84' and inner sleeve 86' at an axially forward end of inner sleeve 86'. Second seal 116' is an annular seal element disposed between outer sleeve 84' and inner sleeve 86' at an axially aft end of outer sleeve 84'. Fluid damper 124' is a fluid film annulus disposed in gap 88' between outer sleeve 84' and inner sleeve 86'. Threaded portion 126' is a portion of inner sleeve 86' extending in an axially forward direction that includes threads 128'. Resilient element 130' is a spring. Bearing housing 62' is a portion of bearing compartment 50.

Inner sleeve 86' is disposed radially within outer sleeve 84'. Both outer sleeve 84' and inner sleeve 86' include a tapered configuration as shown in FIG. 5. Threads 128' of threaded portion 126' of inner sleeve 86' are rotatably (e.g., threadably) engaged with an actuator or driver (not shown) which can be hydraulically, electro-mechanically, or pneumatically driven. Resilient element 130' is disposed between an aft end of inner sleeve 86' and bearing housing 62'. Resilient element 130' is compressed between inner sleeve 86' and bearing housing 62' so as to apply a spring force against and bias towards inner sleeve 86' and bearing housing 62'.

Inner sleeve 86' is driven to axially translate in an aft direction (e.g., left to right in FIG. 5). As inner sleeve 86' translates in an axially aft direction, gap 88' decreases due to the tapered configuration of outer sleeve 84' and inner sleeve 86'. In order to decrease a size of gap 88', engagement with inner sleeve 86' can be released or reduced, at which point resilient element 130' pushes inner sleeve 86' axially forward such as to return to a starting position and return gap 88' to an initial size.

In other non-limiting embodiments, either outer sleeve 84' or inner sleeve 86' can include at least one stop, for example in the form of a physical projection, that engages with either outer sleeve 84' or inner sleeve 86' to prohibit gap 88' from decreasing past a minimum size.

Figure 6:
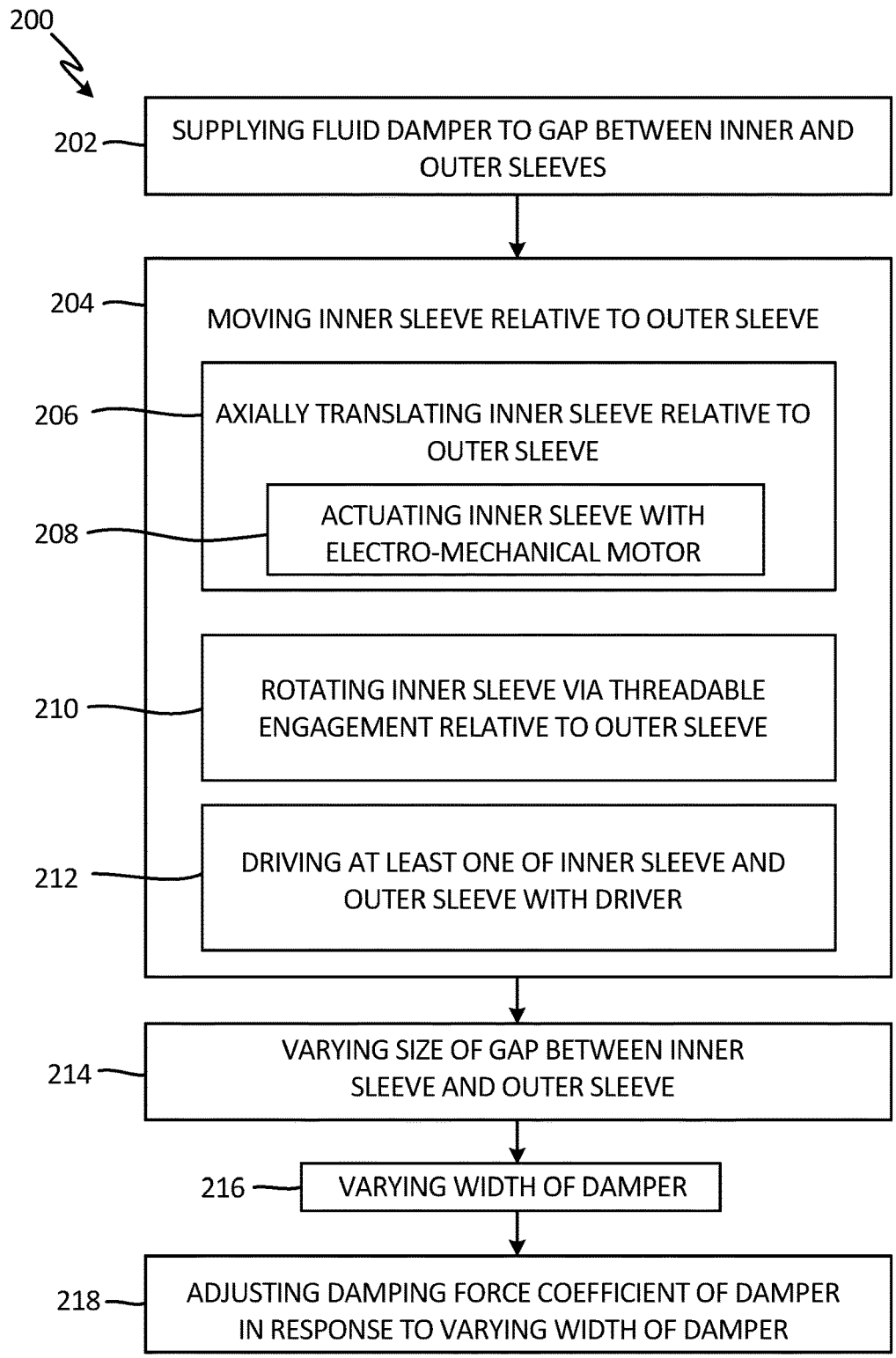
FIG. 6 is a flowchart of a method of controlling a width of a fluid damper in a gap between an inner sleeve and an outer sleeve.

FIG. 6 is a flowchart of method 200 of controlling a width of fluid film damper 124 in gap 88 between inner sleeve 86 and outer sleeve 84. Method 200 includes steps 202-218.

Step 202 includes supplying fluid to gap 88 between inner sleeve 86 and outer sleeve 84 to form fluid film damper 124. Step 204 includes moving inner sleeve 86 relative to outer sleeve 84. Step 204 also includes steps 206-212. Step 206 includes axially translating inner sleeve 86 relative to outer sleeve 84. Step 206 additionally includes step 208 of actuating inner sleeve 86 with an electro-mechanical motor. Step 210 includes rotating inner sleeve 86 via threadable engagement relative to outer sleeve 84. Step 212 includes driving at least one of inner sleeve 86 and outer sleeve 84 with driver 118. Step 214 includes varying a size of gap 88 between inner sleeve 86 and outer sleeve 84. Step 216 includes varying a width of fluid film damper 124. Step 218 includes adjusting a damping force coefficient of fluid film damper 124 in response to varying the width of fluid film damper 124.

DISCUSSION OF POSSIBLE EMBODIMENTS

The following are non-exclusive descriptions of possible embodiments of the present invention.

A bearing damper assembly for a bearing compartment of a gas turbine engine includes a squirrel cage, a bearing support, an outer sleeve, and an inner sleeve. The bearing support is disposed radially outward from a portion of the squirrel cage. The outer sleeve extends axially from the bearing support. The inner sleeve is attached to the squirrel cage and is disposed radially inward from the outer sleeve. An outward surface of the inner sleeve has a first contoured portion having a first axially extending contour and an inner surface of the outer sleeve has a second contoured portion having a second axially extending contour. The outward surface of the inner sleeve and the inner surface of the outer sleeve define a gap extending between the first contoured portion and the second contoured portion. The gap forms a fluid damper.

The bearing damper assembly of the preceding paragraph can optionally include, additionally and/or alternatively, any one or more of the following features, configurations, and/or additional components.

The inner sleeve can comprise a set of thread elements, wherein the outer sleeve can comprise a set of grooves, and wherein the inner sleeve can be threadably engaged with the outer sleeve.

The bearing damper assembly can be configured to control the size of the gap in response to relative rotation between the inner sleeve and the outer sleeve.

The damper can comprise a fluid film annulus.

The damper can be configured to dampen relative vibrations between the inner sleeve and the outer sleeve.

A fluid supply channel can be disposed in the outer sleeve, wherein the fluid supply channel can be fluidly connected to the gap and/or to a fluid source.

A driver can be configured to drive relative motion between the inner sleeve and the outer sleeve.

The driver can comprise a servo motor configured to rotate the inner sleeve relative to the outer sleeve.

The outer surface of the inner sleeve can be tapered and the inner surface of the outer sleeve can be tapered, wherein a degree of taper of the outer sleeve can match a degree of taper of the inner sleeve, and/or the driver can comprise a piston configured to axially translate the inner sleeve.

At least one of the first contoured portion and/or the second contoured portion can be frustoconical.

A method of controlling a width of a fluid damper in a gap between an inner sleeve and an outer sleeve includes supplying the fluid damper to the gap between the inner and outer sleeves. The inner sleeve is moved relative to the outer sleeve to vary a size of the gap between the inner sleeve and the outer sleeve and thereby cause the width of the damper to change.

The method of the preceding paragraph can optionally include, additionally and/or alternatively, any one or more of the following steps, features, configurations, and/or additional components.

A damping force coefficient of the fluid damper can be adjusted in response to varying the width of the fluid damper.

The inner sleeve can be moved relative to the outer sleeve by axially translating the inner sleeve relative to the outer sleeve.

The inner sleeve can be axially translated by actuating the inner sleeve with an electro-mechanical motor.

The inner sleeve can move relative to the outer sleeve by rotating the inner sleeve via threadable engagement relative to the outer sleeve.

The inner sleeve can be moved relative to the outer sleeve by driving at least one of the inner sleeve and outer sleeve with a driver.

A gas turbine engine includes a bearing compartment and a bearing damper assembly disposed in the bearing compartment. The bearing damper assembly includes a squirrel cage, a bearing support, an outer sleeve, and an inner sleeve. The bearing support is disposed radially outward from a portion of the squirrel cage. The outer sleeve extends axially from the bearing support. The inner sleeve is attached to the squirrel cage and is disposed radially inward from the outer sleeve. An outward surface of the inner sleeve has a first contoured portion having a first axially extending contour and an inner surface of the outer sleeve has a second contoured portion having a second axially extending contour. The outward surface of the inner sleeve and the inner surface of the outer sleeve define a gap extending between the first contoured portion and the second contoured portion. The gap forms a fluid damper.

The gas turbine engine of the preceding paragraph can optionally include, additionally and/or alternatively, any one or more of the following features, configurations, and/or additional components.

The outer surface of the inner sleeve can be tapered and the inner surface of the outer sleeve can be tapered, and wherein a degree of taper of the outer sleeve can match a degree of taper of the inner sleeve.

The damper can be configured to dampen relative vibrations between the inner sleeve and the outer sleeve, and wherein the bearing damper assembly can be configured to control the size of the gap in response to relative rotation between the inner sleeve and the outer sleeve.

A driver can be configured to drive relative motion between the inner sleeve and the outer sleeve.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A bearing damper assembly for a bearing compartment of a gas turbine engine, the bearing damper assembly comprising:
   a squirrel cage;
   a bearing support disposed radially outward from a portion of the squirrel cage;
   an outer sleeve extending axially from the bearing support, wherein the outer sleeve comprises:
      an inner surface that is tapered; and
      a set of grooves disposed on the inner surface of the outer sleeve;
   a supply passage extending through a portion of the outer sleeve and through a portion of the bearing support;
   a fluid source that is fluidly connected to the supply passage; and
   an inner sleeve attached to the squirrel cage, wherein the inner sleeve is disposed radially inward from the outer sleeve, wherein the inner sleeve comprises:
      an outer surface that is tapered; and
      a set of thread elements disposed on the outer surface of the inner sleeve, wherein the inner sleeve is threadably engaged with the outer sleeve, wherein the outer surface of the inner sleeve engages the inner surface of the outer sleeve to define a gap extending therebetween, wherein relative rotation between the inner sleeve and outer sleeve increases or decreases a size of the gap, wherein the gap is fluidly connected to the fluid source to receive a fluid damper via the supply passage.

2. The bearing damper assembly of claim 1, wherein the bearing damper assembly is configured to control the size of the gap in response to relative rotation between the inner sleeve and the outer sleeve.

3. The bearing damper assembly of claim 1, wherein the fluid damper comprises a fluid film annulus.

4. The bearing damper assembly of claim 1, wherein the fluid damper is configured to dampen relative vibrations between the inner sleeve and the outer sleeve.

5. The bearing damper assembly of claim 1 further comprising a driver configured to drive relative motion between the inner sleeve and the outer sleeve.

6. The bearing damper assembly of claim 5, wherein the driver comprises a servo motor configured to rotate the inner sleeve relative to the outer sleeve.

7. The bearing damper assembly of claim 5, wherein a degree of taper of the outer sleeve matches a degree of taper of the inner sleeve.

8. The bearing damper assembly of claim 1, wherein at least one of the first contoured portion and the second contoured portion is frustoconical.

9. A method of controlling a width of a fluid damper in a gap between an inner sleeve and an outer sleeve, the method comprising:
   supplying the fluid damper to the gap between the inner and outer sleeves, wherein the outer sleeve has an inner surface that is tapered and that has grooves, wherein the inner sleeve has an outer surface that is tapered and that has threads, wherein the tapered outer surface of the inner sleeve is threadably engaged with the tapered inner surface of the outer sleeve; and
   moving the inner sleeve relative to the outer sleeve to vary a size of the gap between the inner sleeve and the outer sleeve and thereby cause the width of the fluid damper to change, wherein moving the inner sleeve relative to the outer sleeve comprises rotating the inner sleeve via threadable engagement relative to the outer sleeve.

10. The method of claim 9, further comprising adjusting a damping force coefficient of the fluid damper in response to varying the width of the fluid damper.

11. The method of claim 10, wherein moving the inner sleeve relative to the outer sleeve comprises axially translating the inner sleeve relative to the outer sleeve.

12. The method of claim 11, wherein axially translating the inner sleeve comprises actuating the inner sleeve with an electro-mechanical motor.

13. The method of claim 10, wherein moving the inner sleeve relative to the outer sleeve comprises driving at least one of the inner sleeve and outer sleeve with a driver.

14. A gas turbine engine comprising:
   a bearing compartment;
   a bearing damper assembly disposed in the bearing compartment, wherein the bearing damper assembly comprises:
      a squirrel cage;
      a bearing support disposed radially outward from a portion of the squirrel cage;
      an outer sleeve extending axially from the bearing support, wherein the outer sleeve comprises:
         an inner surface that is tapered; and
         a set of grooves disposed on the inner surface of the outer sleeve;
      a supply passage extending through a portion of the outer sleeve and through a portion of the bearing support;
      a fluid source that is fluidly connected to the supply passage; and
      an inner sleeve attached to the squirrel cage, wherein the inner sleeve is disposed radially inward from the outer sleeve, wherein the inner sleeve comprises:
         an outer surface that is tapered; and
         a set of thread elements disposed on the outer surface of the inner sleeve, wherein the thread elements of the inner sleeve are threadably engaged with the grooves of the outer sleeve, wherein the outer surface of the inner sleeve engages the inner surface of the outer sleeve to define a gap extending therebetween wherein relative rotation between the inner sleeve and outer sleeve increases or decreases a size of the gap, wherein the gap is fluidly connected to the fluid source to receive a fluid via the supply passage.

15. The bearing damper assembly of claim 14, wherein a degree of taper of the outer sleeve matches a degree of taper of the inner sleeve.

16. The bearing damper assembly of claim 14, wherein the damper is configured to dampen relative vibrations between the inner sleeve and the outer sleeve, and wherein the bearing damper assembly is configured to control the size of the gap in response to relative rotation between the inner sleeve and the outer sleeve.

17. The bearing damper assembly of claim 14 further comprising a driver configured to drive relative motion between the inner sleeve and the outer sleeve.

\* \* \* \* \*